US 9,705,915 B2

(12) United States Patent
Johansson

(10) Patent No.: US 9,705,915 B2
(45) Date of Patent: Jul. 11, 2017

(54) TECHNIQUES FOR RELIABLE NETWORK AUTHENTICATION

(71) Applicant: Amazon Technologies, Inc., Seattle, WA (US)

(72) Inventor: Jesper M. Johansson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/885,228

(22) Filed: Oct. 16, 2015

(65) Prior Publication Data

US 2017/0013013 A1 Jan. 12, 2017

Related U.S. Application Data

(62) Division of application No. 13/663,930, filed on Oct. 30, 2012, now Pat. No. 9,165,126.

(51) Int. Cl.
*H04L 29/06* (2006.01)
*G06F 21/31* (2013.01)
*G06F 21/72* (2013.01)
*H04L 9/32* (2006.01)

(52) U.S. Cl.
CPC ......... *H04L 63/1466* (2013.01); *G06F 21/31* (2013.01); *G06F 21/72* (2013.01); *H04L 9/321* (2013.01); *H04L 9/3263* (2013.01); *H04L 63/0869* (2013.01); *H04L 63/10* (2013.01); *H04L 63/166* (2013.01)

(58) Field of Classification Search
CPC ........ H04N 2201/3233; H04N 1/32144; H04L 9/3247; H04L 9/3263
USPC .................................................... 713/76, 169
See application file for complete search history.

(56) References Cited

U.S. PATENT DOCUMENTS

| | | | |
|---|---|---|---|
| 5,872,847 A | 2/1999 | Boyle et al. | |
| 8,117,452 B2 | 2/2012 | Bell et al. | |
| 8,826,240 B1 | 9/2014 | Lachwani et al. | |
| 2002/0144119 A1 | 10/2002 | Benantar | |
| 2004/0133395 A1 | 7/2004 | Ding et al. | |
| 2005/0015594 A1* | 1/2005 | Ashley | G06F 21/31 713/168 |
| 2009/0106556 A1* | 4/2009 | Hamid | G06F 21/606 713/176 |
| 2014/0075185 A1 | 3/2014 | Dragomir et al. | |
| 2014/0095865 A1* | 4/2014 | Yerra | H04L 9/3265 713/156 |
| 2014/0173686 A1 | 6/2014 | Kgil et al. | |

* cited by examiner

*Primary Examiner* — Dao Ho
(74) *Attorney, Agent, or Firm* — Thomas | Horstemeyer, LLP

(57) ABSTRACT

Disclosed are various embodiments of techniques that may be used to improve the reliability of network authentication. A communication session is established between a server computing device and a client computing device. The communication session is established via a network using a credential for a network site. A verifier for the credential is generated, which may be used to confirm the authenticity of the credential. The verifier is provided to the client computing device via the network.

16 Claims, 4 Drawing Sheets

TECHNIQUES FOR RELIABLE NETWORK AUTHENTICATION

CROSS-REFERENCE TO RELATED APPLICATIONS

This application is a continuation of, and claims priority to, co-pending U.S. Patent Application entitled "TECHNIQUES FOR RELIABLE NETWORK AUTHENTICATION," filed on Oct. 30, 2012, and assigned application Ser. No. 13/663,930, which is incorporated herein by reference in its entirety.

BACKGROUND

In an age of information, people may exchange data over communication sessions that may traverse various networks. Those participating in the communication session may wish to keep the data confidential as to the general public, while also exchanging data with the parties participating in the communication session. Traditional data security architectures suffer from vulnerabilities that may compromise the confidence of the data as it traverses networks such as the Internet.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for detecting and/or deterring the inconspicuous interception of communication session data by network devices, commonly referred to as a "man-in-the-middle" (MitM) attack. During initiation of a communication session between a client and a server, the server may present a set of credentials that may be used to authenticate the particular server as the actual server expected by the client. During a man-in-the-middle attack, an intermediate network device may instead present an alternate set of credentials to the client, which for a variety of possible reasons, may be accepted by the client for authentication.

In some embodiments, a validation application executing in the client may be used to detect the presence of a man-in-the-middle by comparing the current presented credentials for a server to credentials or other identifiers presented previously during a prior communication session. In further embodiments, a marking service executing in a server may covertly provide credentials or other identifiers for verification by a client. In various embodiments, the server and/or client may initiate computationally intensive operations such as re-negotiation of communication sessions, multiple layers of encryption for a portion of the communication session, and/or other actions that may deter and/or detect man-in-the-middle activities. In the following discussion, a general description of the system and its components is provided, followed by a discussion of the operation of the same.

Figure 1:
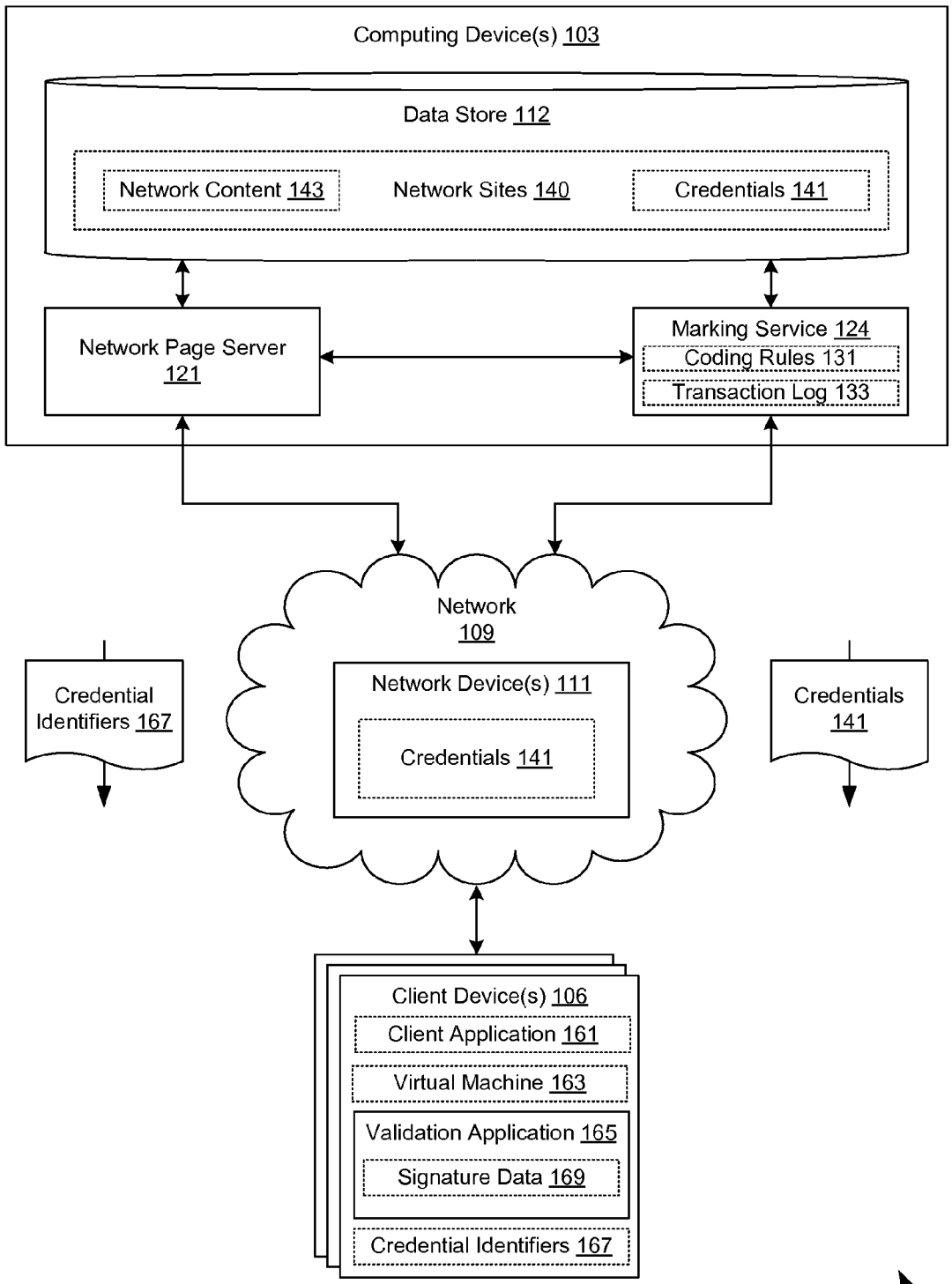
FIG. 1 is a drawing of a networked environment according to various embodiments of the present disclosure.

With reference to FIG. 1, shown is a networked environment 100 according to various embodiments. The networked environment 100 includes a computing device 103 in data communication with one or more client devices 106 by way of the network 109. The network 109 includes, for example, the Internet, intranets, extranets, wide area networks (WANs), local area networks (LANs), wired networks, wireless networks, or other suitable networks, etc., or any combination of two or more such networks. Data communication transiting the network 109 may be forwarded and/or examined by a network device 111.

The computing device 103 may comprise, for example, a server computer or any other system providing computing capability. Alternatively, the computing device 103 may comprise a plurality of servers or other computing devices that are arranged, for example, in one or more server banks or computer banks or other arrangements. For example, the computing device 103 may comprise a cloud computing resource, a grid computing resource, and/or any other distributed computing arrangement. The computing device 103 may be located in a single installation or may be distributed among many different geographical locations.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page server 121, marking service 124, and other applications, services, processes, systems, engines, or functionality not discussed in detail herein. The network page server 121 may encode for display network pages, data for mobile applications, or other network content embodied in some other form that facilitates access to one or more network sites. To that end, the network page server 121 may serve data such as network pages to client devices 106 over a communication session using a protocol such as hypertext transfer protocol (HTTP), HTTP Secure (HTTPS), simple object access protocol (SOAP), representational state transfer (REST), user datagram protocol (UDP), transmission control protocol (TCP), and/or other protocols. Such a network page server 121 may comprise a commercially available network page server 121 such as, for example, Apache® HTTP Server, Apache®

Tomcat®, Microsoft® Internet Information Services (IIS), and/or other network page servers.

In some embodiments, the network page server 121 may secure a portion of the communication session with the client device 106 using secure sockets layer/transport layer security (SSL/TLS), such as may be used for the HTTPS protocol, and/or other protocols as can be appreciated. In order to facilitate establishing a secure communication session, the network page server 121 may use various credentials such as, for example, X.509 digital certificates, public keys, private keys, shared keys, and/or other types of credentials as can be appreciated.

The marking service 124 is executed in order to facilitate validation of credentials presented to a client device 106 on behalf of the computing device 103. To this end, the marking service 124 may communicate with the network page server 121 in order to provide various possible types of credential identifiers and/or other data to the client device 106. The marking service 124 may communicate with the network page server 121 using various protocols such as, for example, HTTP, HTTPS, SOAP, REST, UDP, TCP, and/or other protocols. The credential identifiers may include all or a portion of a credential, a cryptographic hash value for a credential, and/or other data that may be used to identify the particular credential 141.

In some embodiments, the marking service 124 may include coding rules 131, a transaction log 133, and/or other possible data. The coding rules 131 comprise rules for providing network content including credential identifiers ("verifiers") to client devices 106. The coding rules 131 may specify types of credential identifiers to be used, the method of delivery for the credential identifiers, rules for particular client devices 106 or groups of client devices 106, and/or other possible specifications as can be appreciated.

The transaction log 133 comprises data associated with historical use or non-use of the credential identifiers during a communication session between the network page server 121 and a client device 106. For a given communication session, the transaction log 133 may include the credential identifiers delivered to a client device 106, the network content or other data used to deliver the credential identifiers, the coding rule 131 used to initiate delivery or non-delivery of a credential identifier, and/or other potential activities. In other embodiments, the functionality of the marking service 124 may be integrated into the network page server 121 or may be a "plug-in" program module integrating with the network page server 121 using an application programming interface (API) or other programmatic interface of the network page server 121.

The data stored in the data store 112 includes, for example, data relating to network sites 140 and potentially other data. Each of the network sites 140 comprises various data associated with the presence of a distinct network presence, such as a website, that may be accessible through the network page server 121. The credentials 141 for each network site may include X.509 digital certificates, public keys, private keys, shared keys, and/or other types of credentials as can be appreciated. The network content 143 includes network pages, images, video, audio, and/or other types of content that may be delivered to a client device 106 by the network page server 121. Furthermore, the network content 143 may include applications or other types of objects executable in a virtual machine such as, for example, Flash®, Java®, or JavaScript®.

The client device 106 is representative of a plurality of client devices 106 that may be coupled to the network 109. The client device 106 may comprise, for example, a processor-based system such as a computer system. Such a computer system may be embodied in the form of a desktop computer, server, laptop computer, personal digital assistant, smartphone, set-top box, tablet computer system, game console, electronic book reader, or other devices with like capability.

The client device 106 may be configured to execute various applications such as a client application 161, virtual machine 163, validation application 165, and/or other applications. The client application 161 may be executed in a client device 106, for example, to access and render network content 143 served up by the network page server 121 and/or other servers, thereby rendering a user interface on the display. The client application 161 may, for example, correspond to a browser, a mobile application, etc., and the user interface may correspond to a network page, a mobile application screen, etc. The virtual machine 163 is a software implementation of a computer that is capable of executing the validation application 165 and potentially other applications and objects as would a physical computing device. Various virtual machines 163 may be available on the client device 106 including, for example, Flash®, Java®, JavaScript®, Python, and/or other virtual machines 163 as can be appreciated.

The validation application 165 is executed in order to validate credentials 141 presented to the client application 161 on behalf of the computing device 103 during the course of establishing a communication session. To this end, the validation application 165 may obtain one or more credential identifiers 167 ("verifiers") for a given credential 141. The credential identifiers 167 may be embedded within the validation application 165, stored from prior communication sessions with the computing device 103, obtained from the network content 143, and/or from other possible sources. In some embodiments, signature data 169 may be used to specify locations from which credential identifiers 167 for a particular network site 140 may be obtained.

The network device 111 is representative of a plurality of network devices that may forward and/or examine communication data transiting the network 109. The network device 111 may comprise, for example, a processor-based system such as a computer system. Such a computer system may be embodied in the form of a server, network router, a network switch, a network proxy, a firewall, or other devices with like capability. The network device 111 may comprise one or more credentials 141 that may be used to authenticate as one or more network sites 140 that may or may not be hosted in the network device 111.

Next, a general description of the operation of the various components of the networked environment 100 is provided. To begin, an operator of the client device 106 uses the client application 161 to initiate a communication session with the network page server 121. The network page server 121 may offer one or more credentials 141, which may be used to authenticate the identity of the computing device 103 and/or the network page server 121 to the client device 106. For example, the communication session may be carried out using the HTTPS protocol, which employs SSL/TLS to provide authentication, confidentiality, and potentially other services. Using the SSL/TLS protocol, the network page server 121 may provide the client device 106 with a credential 141, such as a digital certificate, that may be used by the client application 161 to authenticate the computing device 103 and/or the network page server 121.

The data exchanged during initiation and operation of the communication session traverses the network 109, and may include a path transiting the network device 111. As the data transits the network device 111, the network device 111 may intercept and/or modify the data, including the credential 141 used during initiation of the communication session. As a result, a communication session that appears to terminate only on the client device 106 and the computing device 103, may instead be two communication sessions—one session between the client device 106 and the network device 111, and the second session between the network device 111 and the computing device 103. This scenario may be possible due to ability of the network device 111 to successfully convince the client application 161 that a forged credential 141 of the network device 111 is the proper credential 141 for the computing device 103 and/or the network page server 121. Although the various techniques described in this disclosure may operate with or without a network device 111 performing such a "man-in-the-middle" interception, the techniques may be used to reduce the likelihood that such interceptions are attempted.

In some embodiments, the validation application 165 executing in the client device 106 may obtain the credential 141 presented to the client application 161 during initiation of a present communication session. The credential 141 used in the present communication session may then be validated as the proper credentials for a given network site using one or more operations appropriate for the type of credential 141 and corresponding credential identifier(s) 167 available.

In some embodiments, for network sites 140 using a credential 141 that having been previously accessed by the client application 161, the validation application 165 may store a credential identifier 167 for the network site 140. Each of the credential identifiers 167 stored may be all or a portion of the credential 141, derived from the credential 141 such as a cryptographic hash value or a digital signature, and/or other possible identifying data.

For example, a website for an electronic marketplace may use an X.509 digital certificate as a credential 141. The digital certificate may contain various fields including a digital signature, an issuing certificate authority, and/or other possible data. In order to create a credential identifier 167 for the digital certificate, the validation application 165 may store the complete digital certificate, digital signature value of the digital certificate, the certificate authority used to issue the digital certificate, and/or other possible identifying data.

Using one or more credential identifiers 167 corresponding to one or more previous communication sessions with a particular network site 140, the validation application 165 may validate that the credential 141 currently presented has been previously observed. Returning to the previous example, the credential identifiers 167 for an electronic marketplace may indicate a digital certificate issued by the certificate authority, "TrustCorp," was previously presented for the electronic marketplace. In this example, the validation application 165 may generate a notice or initiate another action if the digital certificate now presented, perhaps by an intermediate network device 111, is issued by the certificate authority, "RogueCorp." Likewise, a digital signature or cryptographic hash may be used to determine if any portion of a credential 141 such as a digital certificate has been altered.

In some embodiments, one or more credential identifiers 167 may be delivered by the computing device 103 to present client devices 106, thereby enabling validation of a credentials 141 without relying upon previously acquired credential identifiers 167. To this end, the credential identifiers 167 may be inserted as a digital watermark into network content 143 for a network site 140 by the marking service 124. The marking service 124 may identify an on-going communication session between the network page server 121 and the client application 161 which employs a credential 141 for a network site 140. The marking service 124 may observe requests by the client application 161 for particular network content 143, and may insert credential identifiers 167 into select network content 143 matching the coding rules 131.

For example, the network site 140 may be a website with various network content 143, including a background image. The coding rules 131 may specify insertion of a digital signature for a credential 141 into the background image of the website. In this example, the digital signature may be inserted into a metadata portion of the image, inserted into a visual portion of the image using steganography, and/or using various other techniques appropriate for the type of network content 143 and credential identifier to be inserted. The coding rules 131 may further specify actions to be undertaken on the basis of an identity of a client device 106. For example, for a client device 106 having a network address from a particular geographic region, it may be desirable to insert (or not) a credential identifier 167 into network content 143 provided to the particular client device 106. The geographic region may be determined based upon a geolocation sensor in the client device 106, a location of the network address used by the client device 106, and/or other possible techniques.

Actions associated with insertion and/or abstentions from inserting credential identifiers 167 into the network content 143 may be recorded by the marking service 124 in the transaction log 133. The marking service 124 may further generate signature data 169 to be used by the validation application 165 to obtain the credential identifiers 167 that may be embedded within network content 143 for a given network site 140. The signature data 169 may be based upon the coding rules 131 and/or the transaction log 133 and may be distributed to the client device 106. The signature data 169 may be distributed to the client device 106 using the current or an auxiliary communication session with the computing device 103, through a centralized update site accessible through the network 109, and/or through other possible operations.

Once the validation application 165 obtains the credential identifiers 167 in the network content 143, the validation application 165 may validate the credential 141 as previously described. In various embodiments, the validation application 165 itself may be network content 143 delivered to the client device 106. For example, the validation application 165 may be a Flash® object or other code executable in a virtual machine 163 of the client device 106. In this example, the credential identifiers 167 and/or signature data 169 may be embedded in the code delivered to the client device 106. Once the validation application 165 obtains the credential identifiers 167, the validation application 165 may validate the credential 141 as previously described.

Returning to the marking service 124, in some embodiments, the coding rules 131 may direct the marking service 124 to re-negotiate an active communication session with the client application 161, negotiate one or more additional communication sessions with the client application 161, and/or other possible operations using the existing credential 141 of the network site 140. Similarly, these operations may also or instead be carried out by the client application 161 under the direction of the validation application 165. While negotiations and re-negotiations of communication sessions may not reveal the presence of a network device 111 as a "man-in-the-middle," these may be regarded as computationally "expensive" operations. Thus, it may reduce the likelihood that such an attack may be carried out.

Similarly, in some embodiments, the coding rules 131 may direct the marking service 124 to apply an additional encryption operation to a portion of the network content 143. Similarly, this operation may also or instead be carried out by the client application 161 under the direction of the validation application 165 configured with the signature data 169. The appearance of such "double-encrypted" data that cannot be decrypted by receiving device may indicate the presence of a network device 111 as a "man-in-the-middle."

In this scenario, the network device 111 acting as an intermediary within the communication session may not be aware that portions of the network content have been double-encrypted. Therefore, the network device 111 may correctly translate ordinary data traversing the communication session, but may not be aware that the double-encrypted data should have an additional translation operation applied. Upon discovery of such a scenario, the network page server 121, the client application 161, and/or other service may generate a notice, end the communication session, and/or initiate another action.

Figure 2:
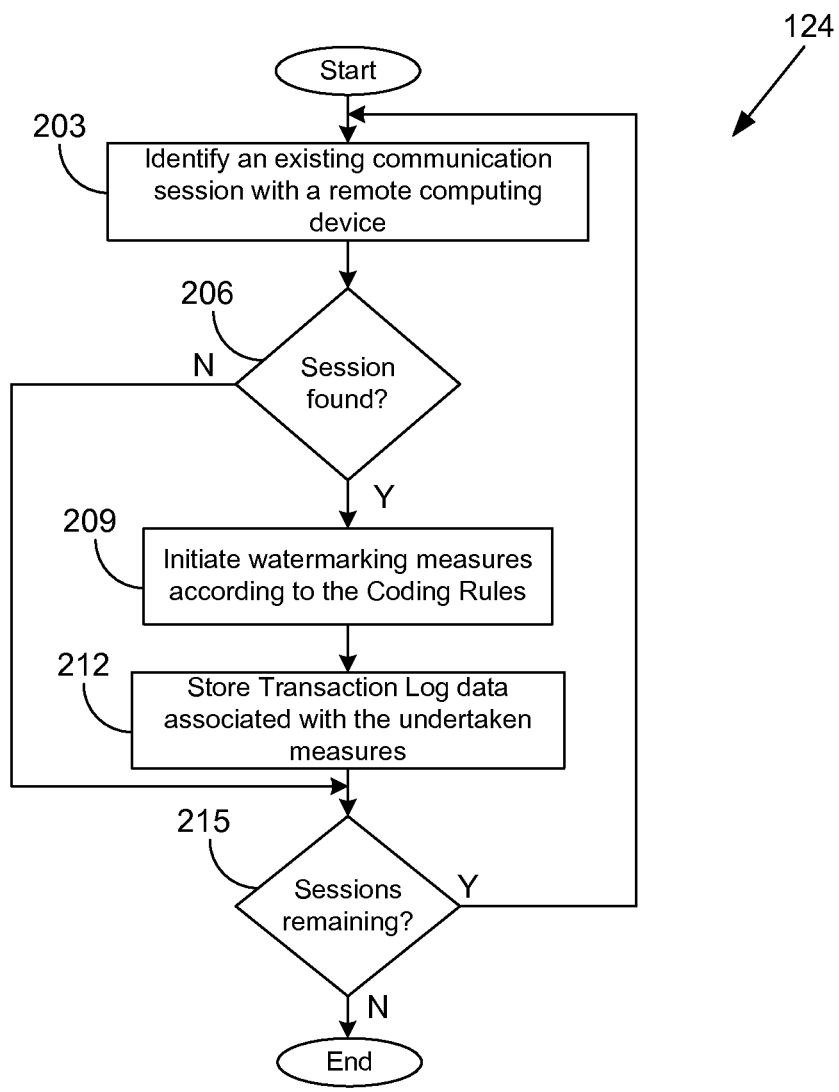
FIG. 2 is a flowchart illustrating one example of functionality implemented as portions of a marking service executed in a computing device in the networked environment of FIG. 1 according to various embodiments of the present disclosure.

Referring next to FIG. 2, shown is a flowchart that provides one example of the operation of a portion of the marking service 124 according to various embodiments. It is understood that the flowchart of FIG. 2 provides merely an example of the many different types of functional arrangements that may be employed to implement the operation of the portion of the marking service 124 as described herein. As an alternative, the flowchart of FIG. 2 may be viewed as depicting an example of steps of a method implemented in the computing device 103 (FIG. 1) according to one or more embodiments.

This portion of the execution of the marking service 124 may be executed based on obtaining coding rules 131 (FIG. 1) with which to identify and mark data exchanged during a communication session between a network page server 121 (FIG. 1) and a client device 106 (FIG. 1). Beginning with block 203, the marking service 124 may communicate with the network page server 121 to identify one or more established communication sessions with a client device 106.

Next, in block 206, the marking service 124 determines if one of the communication sessions matches the criteria of the coding rules 131. The marking service 124 may select a subset of the established communication sessions for marking based upon, for example, the location of the client device 106, an operator of the client application 161 (FIG. 1), the communication session activity, and/or other possible selection criteria as can be appreciated.

If the currently examined communication session does not match the criteria of the coding rules 131, execution of the marking service 124 may proceed to block 215. Alternatively, if the examined communication session does match the criteria, the marking service 124, in block 209, may initiate one or more actions, such as "watermarking," prescribed in the coding rules 131. As previously described, these actions may comprise embedding an identifier for a credential 141 (FIG. 1) within network content 143 (FIG. 1), delivering a validation application 165 (FIG. 1) within the network content 143, initiating a re-negotiation of the communication session, layering of encrypted data within the communication session, and/or other possible actions.

Then, in block 212, the marking service 124 may store a transaction log 133 (FIG. 1) of data associated with the various actions undertaken and/or foregone. Such data may include the criteria of the coding rules 131 used to identify the network content 143, credential identifier data inserted into the network content 143 or provided to the client device 106, any prior value of data modified in the communication session (e.g. layering of encryption), and/or other possible data. Subsequently, in block 215, the marking service 124 determines if there are any further communication sessions remaining that have not been examined and/or marked. If no more communication sessions remain, this portion of the execution of the marking service 124 ends as shown. Alternatively, if other tables do remain, execution of the marking service 124 returns to block 203.

Figure 3:
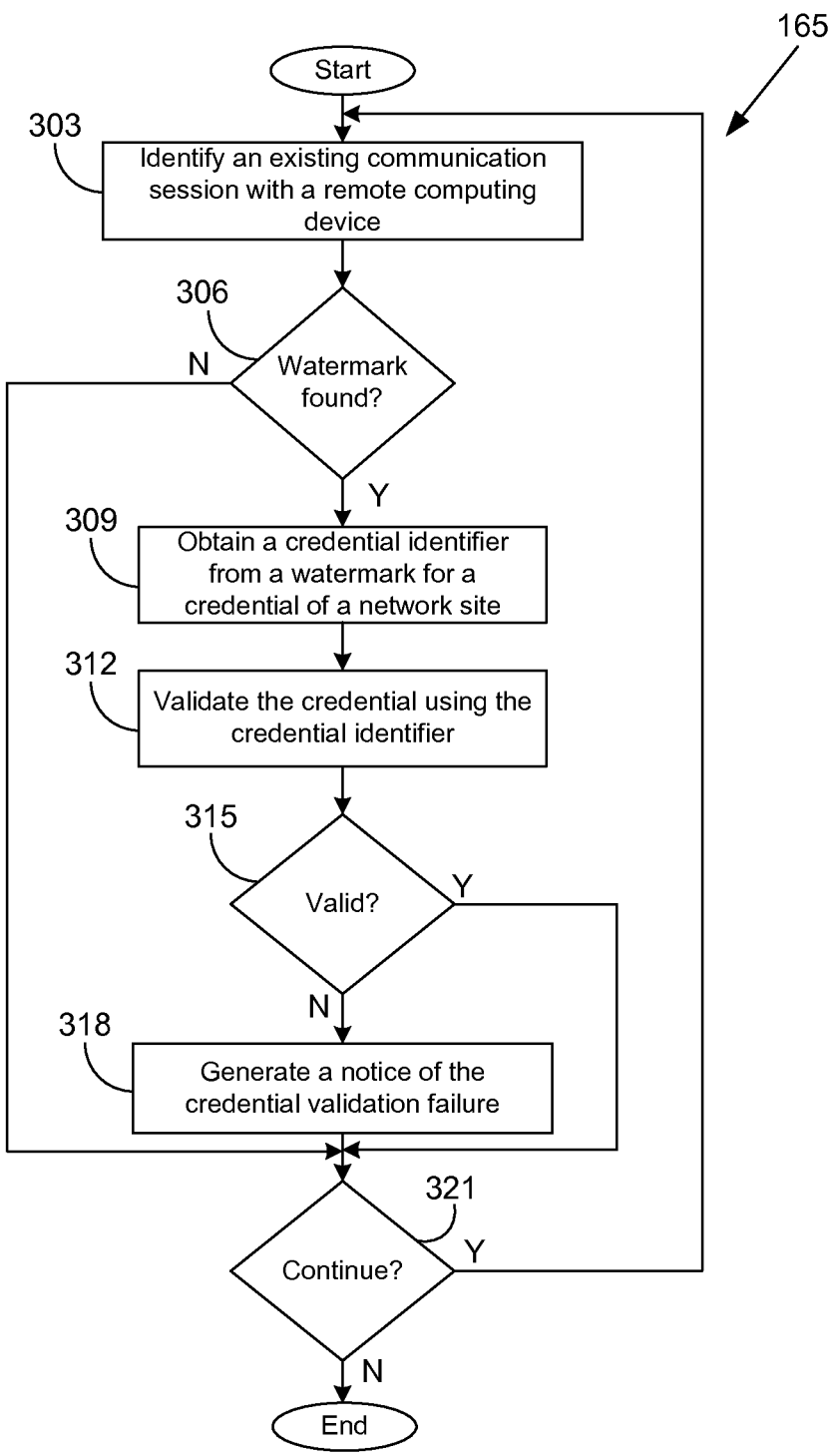
FIG. 3 is a flowchart illustrating one example of functionality implemented as portions of a validation service executed in a computing device in the networked environment of FIG. 1 according to various embodiments of the present disclosure.

Turning now to FIG. 3, shown is a flowchart that provides one example of the operation of a portion of the validation application 165 according to various embodiments. It is understood that the flowchart of FIG. 3 provides merely an example of the many different types of functional arrangements that may be employed to implement the operation of the portion of the validation application 165 as described herein. As an alternative, the flowchart of FIG. 3 may be viewed as depicting an example of steps of a method implemented in the computing device 103 (FIG. 1) according to one or more embodiments.

This portion of the execution of the validation application 165 may be executed based on obtaining signature data 169 (FIG. 1) with which to locate and obtain credential identifiers 167 (FIG. 1) provided by the computing device 103 and/or other data stores accessible via the network 109 (FIG. 1). Beginning with block 303, the validation application 165 may communicate with the client application 161 (FIG. 1) to identify one or more established communication sessions with a network page server 121 (FIG. 1) of a computing device 103 (FIG. 1).

Next, in block 306, the validation application 165 determines if a communication session of the client application 161 with a network site 140 corresponds to the criteria specified in the signature data 169. The signature data 169 may provide locations and techniques for obtaining credential identifiers, such as through the presence of digital watermarks, corresponding to various possible network sites 140 (FIG. 1). However, if the currently examined communication session does not match the criteria, such as a network site 140, of the signature data 169, execution of the validation application 165 may proceed to block 321.

Alternatively, if the examined communication session does match the criteria, the validation application 165, in block 309, may obtain a credential identifier 167 using the information provided in the signature data 169. The signature data 169 may specify various locations and techniques to obtain credential identifiers 167 for a given network site 140, including from within network content 143 having a digital watermark. For example, a network site 140, such as a website for an electronic marketplace, may embed a Java® applet in page for user authentication. In this example, the Java® applet may be capable of providing credential identifiers 167 to the validation application 165. Continuing the example, a masthead image for the electronic marketplace may also contain credential identifiers 167 within the metadata stored in the image file and/or credential identifiers 167 embedded using steganographic techniques.

Then, in block 312, the validation application 165 may validate the credential 141 (FIG. 1) presented to the client application 161 during establishment of the communication session. As previously described, each credential identifier 167 may be a copy of the proper credential 141 itself, a portion of the credential 141, a cryptographic hash value of the identifier 167, and/or other possible formats. The validation operation may determine the validity of the credential 141 using techniques appropriate for the credential 141 and the available credential identifiers 167.

Next, in block 315, the validation application 165 may determine if the credential presented to the client is the authentic credential 141 for a network site or a forged credential 141. If the credential is the authentic credential 141, execution of the validation application 165 may proceed to block 321. Alternatively, if the validation application 165 determines the credential is not the authentic credential 141, and thus may be a forged credential 141, the validation application 165 may, in block 318, generate a notice for the validation failure, as well as potentially initiate other actions.

Moving on, in block 321, the validation application 165 may determine if execution should continue on the basis of a user request, a lack of further unvalidated communication sessions, and/or other possible reasons. If execution of the validation application is to continue, the execution of the validation application 165 returns to block 303. Alternatively, this portion of the execution of the validation application 165 ends as shown.

Figure 4:
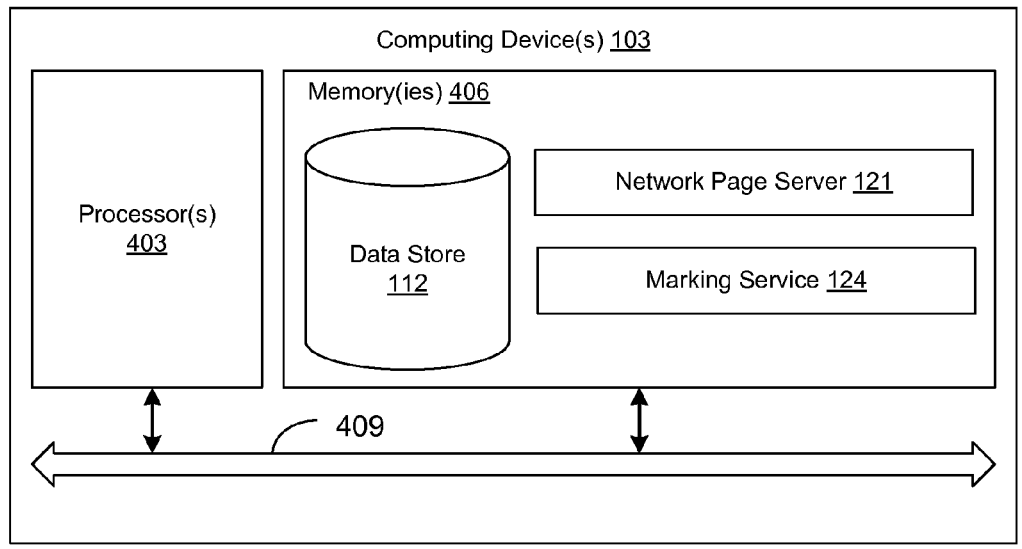
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page server 121, marking service 124, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java®, JavaScript®, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Figure 5:
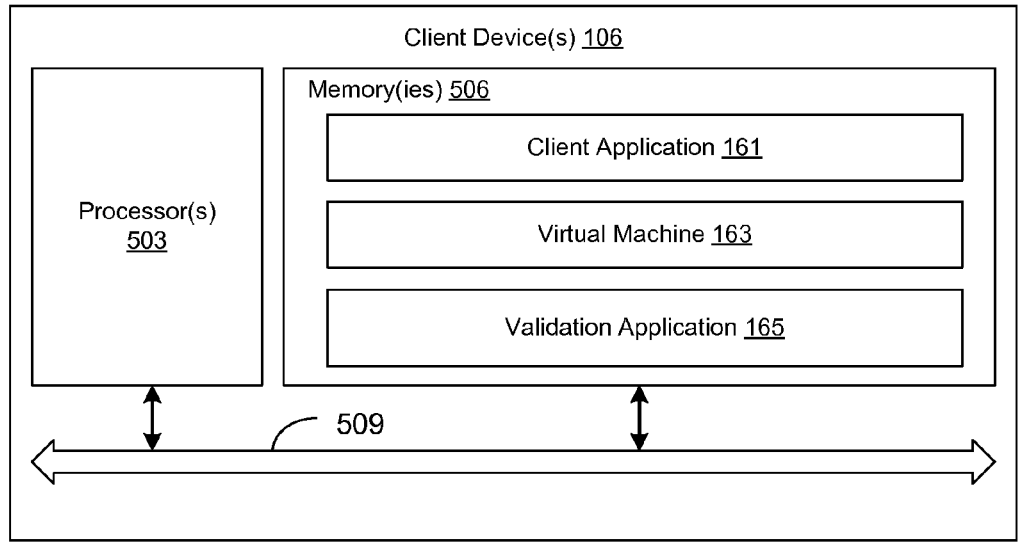
FIG. 5 is a schematic block diagram that provides one example illustration of a client device employed in the networked environment of FIG. 1 according to various embodiments of the present disclosure

With reference to FIG. 5, shown is a schematic block diagram of the client device 106 according to an embodiment of the present disclosure. The client device 106 includes at least one processor circuit, for example, having a processor 503 and a memory 506, both of which are coupled to a local interface 509. To this end, the client device 106 may comprise, for example, at least one client computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the client application 161, virtual machine 163, validation application 165, and potentially other applications. Also stored in the memory 506 may be a data store and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network page server 121, marking service 124, client application 161, virtual machine 163, validation application 165, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the marking service 124 and the validation application 165, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403/503 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the marking service 124 and validation application 165, that comprises software or code can be embodied in any non-transitory computer-readable medium for use by or in connection with an instruction execution system such as, for example, a processor 403/503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the Therefore, the following is claimed:

1. A non-transitory computer-readable medium embodying a program executable in a client device, wherein when executed the program causes the client device to at least:

establish a communication session with a web server of a server computing device, the communication session being established via a network using an offered credential for a website served by the web server, the communication session using secure socket layer/transport layer security (SSL/TLS);

receive signature data for the website, the signature data specifying a location of a first verifier for the website, the first verifier being based at least in part upon an authentic credential of the website;

receive the first verifier for the website, the first verifier being obtained from a watermark in a network page of the website and being located using the signature data;

retrieve a second verifier for the website, the second verifier being stored in the client device and based at least in part upon a recognized credential of the website, the recognized credential being obtained from at least one previous communication session with the web server;

generate a validation of the offered credential obtained, via an intermediate network device of the network by the client device, the validation using the first verifier and the second verifier for the web site; and initiate a re-negotiation of the communication session in response to a failure of the validation;

wherein the program is executable within a virtual machine in the client device;

wherein execution of the virtual machine is initiated through a browser of the client device.

2. A system, comprising:

a data store storing verifier data;

at least one computing device in communication with the data store; and at least one application executable within a virtual machine in the at least one computing device, wherein execution of the virtual machine is initiated through a browser of the at least one computing device, wherein when executed the at least one application causes the at least one computing device to at least:

establish a communication session with a web server via a network using an offered credential for the web server;

receive signature data for the web server that specifies a location of a first verifier, the first verifier being based at least in part upon an authentic credential of the web server;

retrieve a network page from the web server, wherein the first verifier is obtained from a watermark embedded in the network page;

retrieve the first verifier from the network page using the location specified in the signature data;

retrieve a second verifier stored in the data store, the second verifier being based at least in part upon a recognized credential of the web server obtained from at least one previous communication session; and generate a validation of the offered credential using the first verifier and the second verifier.

3. The system of claim 2, wherein the second verifier is a copy of the recognized credential.

4. The system of claim 2, wherein the communication session uses secure socket layer/transport layer security (SSL/TLS).

5. The system of claim 2, wherein when executed the at least one application further causes the at least one computing device to at least initiate a re-negotiation of the communication session in response to a failure of the validation.

6. The system of claim 2, wherein when executed the at least one application further causes the at least one computing device to at least terminate the communication session in response to a failure of the validation.

7. The system of claim 2, wherein generating the validation further comprises comparing a cryptographic hash value of the offered credential with a cryptographic hash value of the recognized credential.

8. The system of claim 2, wherein the signature data is received from a centralized update site rather than from the web server.

9. A method, comprising:

establishing, via an application of one or more computing devices, a communication session with a network page server via a network using an offered credential for the network page server, wherein the application is executable within a virtual machine in the one or more computing devices, wherein execution of the virtual machine is initiated through a browser of the one or more computing devices;

receiving, via the application of the one or more computing devices, signature data for the network page server that specifies a location of a first verifier;

retrieving a network page from the network page server, wherein the first verifier is embedded in a watermark of the network page;

retrieving, via the application of the one or more computing devices, the first verifier from the watermark of the network page using the location specified in the signature data;

retrieving, via the application of the one or more computing devices, a second verifier stored in a data store, the second verifier being based at least in part on data obtained from at least one previous communication session; and generating, via the application of the one or more computing devices, a validation of the offered credential using the first verifier and the second verifier.

10. The method of claim 9, wherein the offered credential comprises a digital certificate.

11. The method of claim 9, further comprising extracting, via at least one of the one or more computing devices, the first verifier from an image of the network page retrieved from the network page server, wherein the first verifier is embedded in the image using steganography.

12. The method of claim 9, wherein the data obtained from at least one previous communication session corresponds to a recognized credential of the network page server.

13. The method of claim 9, wherein the first verifier is based at least in part on an authentic credential of the network page server.

14. The method of claim 9, further comprising receiving, via at least one of the one or more computing devices, the offered credential from an intermediate network device of the network rather than from the network page server.

15. The method of claim 9, further comprising initiating, via at least one of the one or more computing devices, a re-negotiation of the communication session in response to a failure of the validation.

16. The method of claim 9, further comprising terminating, via at least one of the one or more computing devices, the communication session in response to a failure of the validation.

\* \* \* \* \*